Nov. 1, 1960

P. G. ARVAN 2,958,577

NOVEL REACTION PRODUCT OF AMMONIA, WATER
AND PHOSPHORUS PENTOXIDE

Filed Aug. 30, 1955

3 Sheets-Sheet 3

*INVENTOR.*
PETER G. ARVAN
BY
HIS ATTORNEY

United States Patent Office 2,958,577
Patented Nov. 1, 1960

2,958,577
NOVEL REACTION PRODUCT OF AMMONIA, WATER AND PHOSPHORUS PENTOXIDE

Peter G. Arvan, Wakefield, Mass., assignor to Monsanto Chemical Company, St. Louis, Mo., a corporation of Delaware Filed Aug. 30, 1955, Ser. No. 531,510

4 Claims. (Cl. 23—106)

This invention relates to novel products formed by the reaction of ammonia, water and phosphorus pentoxide. More specifically, the invention relates to such products which are linearly polymeric phosphates containing appreciable amounts of nuclear nitrogen, as well as ammonium nitrogen, in said products.

The term "linearly polymeric," as used herein, refers to open chain (as distinguished from cyclic) compounds containing more than two phosphorus atoms per molecule. The term "ammonium nitrogen" refers to that nitrogen which is present in the form of ammonium ions and is capable of being removed by the hydrogen form of a strong cation exchange resin, e.g., the hydrogen form of a sulfonated polystyrene resin. The term "nuclear nitrogen" refers to nitrogen incapable of being removed in the manner of true ammonium nitrogen.

Polymeric products of anhydrous ammonia and phosphorus pentoxide have been described in the earlier literature, but all attempts to make similar products containing water (in addition to the ammonia and phosphorus pentoxide) have resulted in the formation of only the ammonium salts of metaphosphoric acids containing no nuclear nitrogen. Typical of the anhydrous products formed with anhydrous ammonia and phosphorus pentoxide are those described by Woodstock, U.S. 2,122,122. Typical of the water-containing products are the ammonium metaphosphate salts described by Rice, U.S. 2,561,415.

It has now been found possible to prepare a reaction product of ammonia, water and phosphorus pentoxide which is a linearly polymeric ammonium phosphate containing, in addition to ammonium nitrogen, substantial proportions of nuclear nitrogen. These products are ammonium salts of polyphosphoric acids in which an average of at least one, but not more than four, of every five oxygen atoms have been replaced by —NH— groups (including replacement of —OH groups by —NH$_2$ groups).

Figure 1:
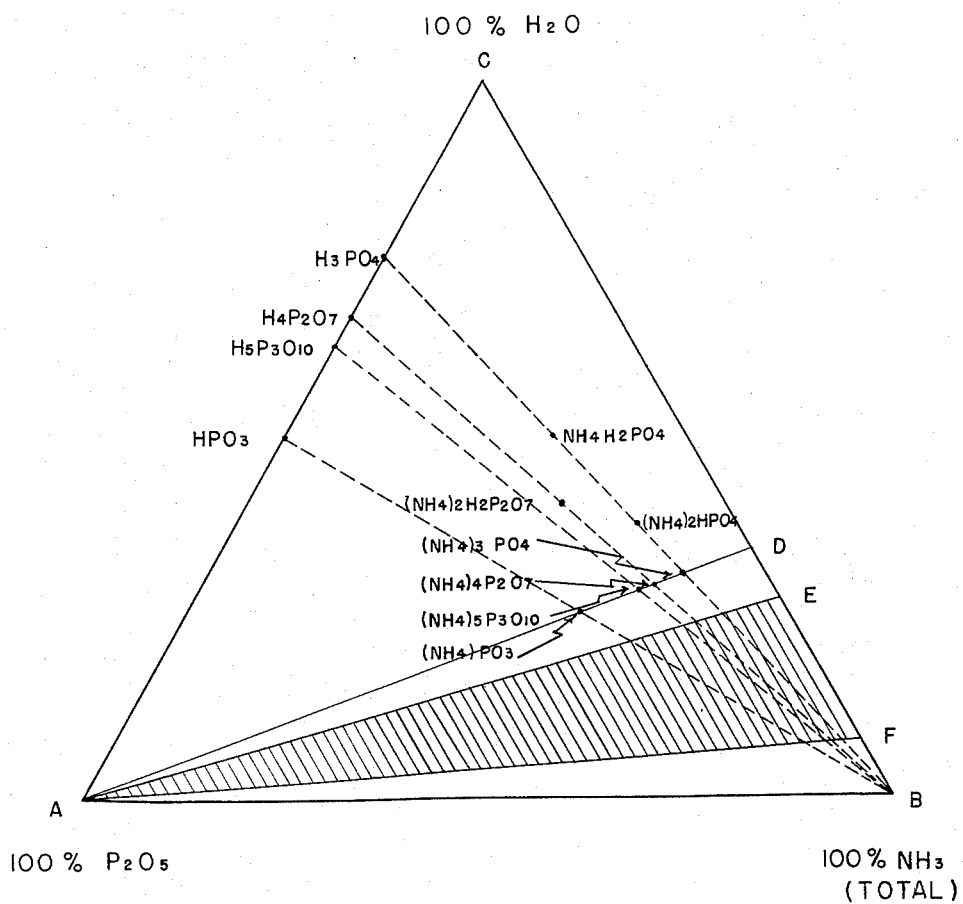
Figure 2:
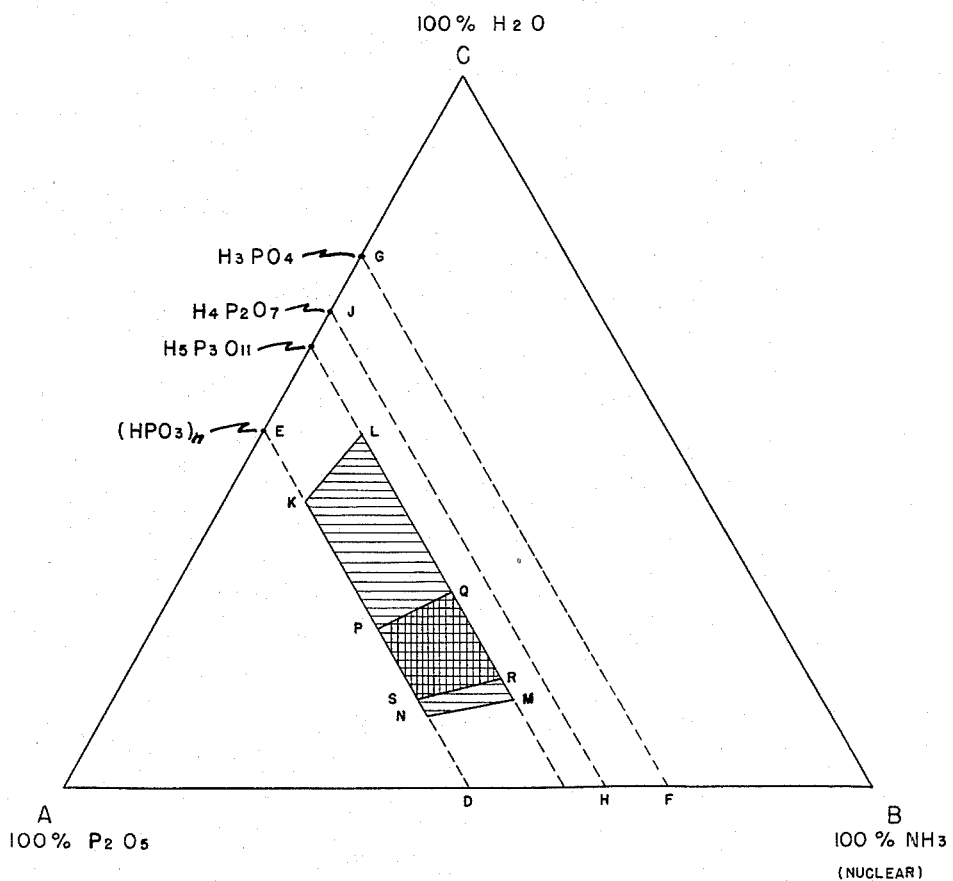

The products can be readily characterized by analysis in terms of phosphorus pentoxide, water, nuclear nitrogen (expressed as NH$_3$) and total nitrogen (expressed as NH$_3$). This characterization can be more readily illustrated by reference to the drawings. For example, Figure 1 is a ternary diagram in which product compositions are represented in terms of mole percentages of P$_2$O$_5$, H$_2$O and total NH$_3$. Figure 2 is similar to Figure 1, except that only "nuclear ammonia" is considered (instead of "total ammonia").

Referring first to Figure 1, it will be noted that the phosphoric acids lie on line AC, which represents compositions containing various proportions of H$_2$O and P$_2$O$_5$. For example metaphosphoric acid contains 50 mole percent H$_2$O, 50 mole percent P$_2$O$_5$; triphosphoric acid contains 62½ mole percent H$_2$O, 37½ mole percent P$_2$O$_5$; pyrophosphoric acid contains 66⅔ mole percent H$_2$O, 33⅓ mole percent P$_2$O$_5$; orthophosphoric acid contains 75 mole percent H$_2$O, 25 mole percent P$_2$O$_5$. The various ammonium salts of these acids lie on lines directly connecting the respective acid compositions with the point B (representing pure NH$_3$). It will be noted that all of the normal ammonium salts (which contain the maximum possible ammonium nitrogen) lie on a line connecting A (100% P$_2$O$_5$) and D (66⅔% NH$_3$, 33⅓% H$_2$O, representing the hypothetical compound (NH$_4$)$_2$O). No compositions containing nitrogen exclusively as ammonium nitrogen lie below line AD. The various anhydrous NH$_3$—P$_2$O$_5$ products (such as described by Woodstock, supra) lie on line AB, representing compositions containing only NH$_3$ and P$_2$O$_5$, with no H$_2$O. Thus, prior to applicant's invention there have been no polymeric phosphates having compositions falling within the area ABD. In contrast thereto, the normal ammonium salts of the compositions of this invention fall between lines AE and AF with respect to H$_2$O, P$_2$O$_5$ and total NH$_3$.

While the foregoing description is sufficient to distinguish the present products from the prior art, it is not sufficient to completely characterize them. Further characterization is obtained by plotting the compositions on a ternary diagram similar to Figure 1, except that nuclear nitrogen (ammonia) is considered instead of total nitrogen (ammonia). Figure 2 represents this latter type of ternary diagram. Since the nitrogen present as ammonium ion does not appear on Figure 2, the compositions represented are the acids corresponding to the ammonium salts of this invention.

In Figure 2, lines of constant P$_2$O$_5$ content represent lines of constant average chain length of the polymeric compositions (with respect to the number of phosphorus atoms per molecule). For example, all compounds upon line DE will be metaphosphoric acids (including amido and/or imido analogs thereof). All compounds upon line FG will be orthophosphoric acids (including amido and/or imido analogs). All compounds having compositions falling upon line HJ will be pyrophosphoric acids (including amido and/or imido analogs), etc. The molar proportions of P$_2$O$_5$, H$_2$O, and nuclear NH$_3$ are related to the average number of phosphorus atoms per polyphosphate molecule by the expression $$\frac{n}{n+2} = \frac{P_2O_5}{H_2O + \text{nuclear NH}_3}$$

wherein $n=$ the average number of phosphorus atoms per molecule. The compositions of the present invention are those having an average chain length of more than three phosphorus atoms per molecule (H$_2$O plus nuclear NH$_3$ equal to 62.5 mole percent of the total of H$_2$O, P$_2$O$_5$ and nuclear NH$_3$), and preferably more than four phosphorus atoms per molecule (H$_2$O plus nuclear NH$_3$ equal to 60 mole percent of the total of H$_2$O, P$_2$O$_5$ and nuclear NH$_3$). With respect to the degree of replacement of —NH— groups for the oxygen atoms in the acid, the compositions of the present invention have molar ratios of H$_2$O to nuclear NH$_3$ between about 4:1 and about 1:4. Thus, the compositions of the present invention can be represented with respect to P$_2$O$_5$, H$_2$O and nuclear NH$_3$ as the area KLMN on Figure 2. Pointed out in greater detail below, preferred compositions having markedly increased water solubility are those falling within the area PQRS. These compositions have a ratio of nuclear NH$_3$ to H$_2$O between about 3:1 and about 11:9.

The products of the present invention can be readily prepared by burning elemental phosphorus in dry air and allowing the combustion product (containing phosphorus pentoxide) to react with a gaseous mixture of ammonia and water vapor. This process is illustrated schematically in Figure 3.

Figure 3:
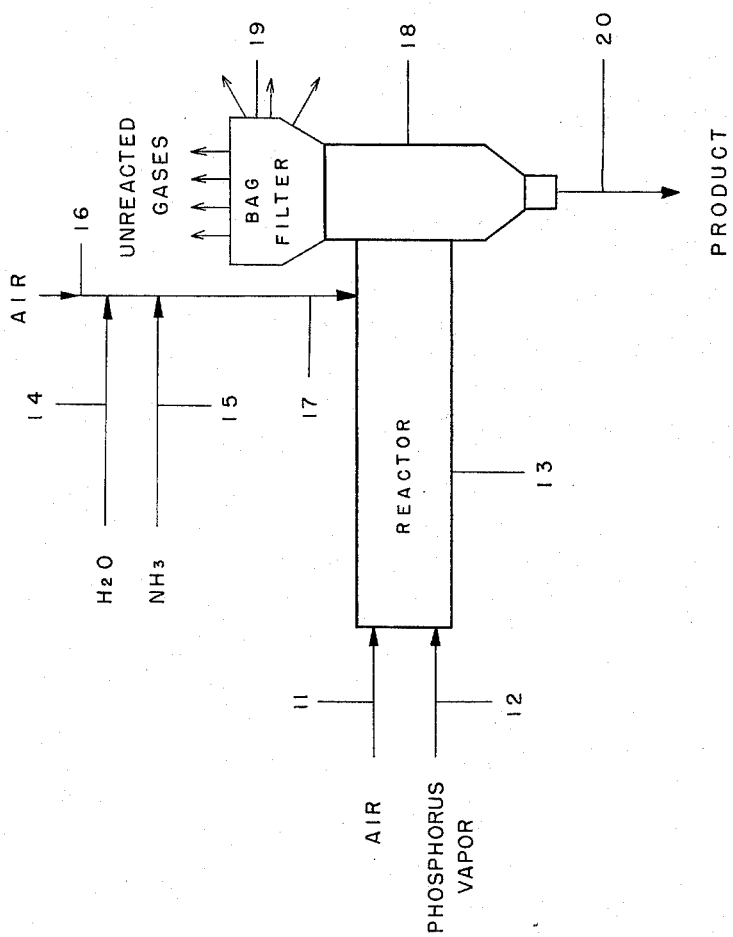

Referring to Figure 3, oxygen (air) and elemental phosphorus vapors are introduced through lines 11 and 12, respectively, into reactor 13, wherein the phosphorus is burned to form a vapor or smoke of phosphorus pentoxide. Water vapor and ammonia are introduced through lines 14 and 15, respectively, mixed together in line 17, and introduced to the reactor 13 just prior to the point at which the reaction products leave the reactor and enter the collector 18. Air or other inert diluent gas is introduced through line 16 and mixed with the water vapor and ammonia in line 17 so that the reaction product of water, ammonia and phosphorus pentoxide is cooled relatively quickly after formation thereof. The excess air and unreacted gaseous reactants pass from the collector 18 through the bag filter 19, and the solid $NH_3$—$H_2O$—$P_2O_5$ reaction product settles out at the bottom of the collector 18 and is withdrawn through line 20.

In the foregoing process it is important that the water not be introduced into the reactor before the ammonia. Prior introduction of water will result in the formation of phosphoric acids, so that subsequent reaction with ammonia will be essentially only a neutralization of the acid. Thus, substantially all of the ammonia will be converted to ammonia nitrogen rather than to nuclear nitrogen. By allowing the $NH_3$ to react directly with the $P_2O_5$ as in the present process, a substantial portion of the nitrogen will be converted to nuclear nitrogen, including imido nitrogen (i.e., nitrogen attached directly to more than one phosphorus atom). In order to minimize the premature formation of phosphoric acids before the ammonia is introduced, it is important that the air utilized to burn the phosphorus be very low in moisture content. Accordingly, it is preferred that the air (or other source of oxygen) be dried to a point such that less than 0.01 parts by weight of water per part by weight of phosphorus is introduced into the reactor during the formation of the $P_2O_5$ and prior to introduction of the ammonia vapors.

The minimum amount of air required in the production of the phosphorus pentoxide will, of course, be that which is sufficient to supply two and one-half atomic proportions of oxygen per atomic proportion of phosprous. It is preferred, however, that at least a 25 percent excess of air be utilized in order to assure smooth and complete oxidation of phosphorus to phosphorus pentoxide. The use of excess air in the combustion of the phosphorus can also be utilized to control the temperature of the phosphorus pentoxide at the point where it reacts with the ammonia and water vapor. The temperature can also be controlled, if necessary, by the application of external heating or cooling means to the reactor itself. If the reaction temperature is too high (e.g., around 650° C. or higher), there will be a tendency for the ammonia to oxidize rather than react with the phosphorus pentoxide and water vapor. If the temperature is too low, the handling of the $P_2O_5$ vapor or smoke becomes difficult as evidence by the build up of $P_2O_5$ in reactor 13. Suitable temperatures for reaction of the phosphorus pentoxide, water and ammonia are those between about 100° C. and about 600° C. Particularly desirable products are those formed at temperatures below about 300° C., and preferably between about 200° C. and 275° C.

Immediately after the ammonia, water vapor and phosphorus pentoxide have been allowed to react, the reaction mixture should be cooled. If the reaction mixture is not cooled, there will be a considerable tendency for glassy phosphates to form and deposit upon the reactor and filter, rather than precipitate as a white, fluffy, powdery product. Cooling of the product can be very conveniently carried out by introducing a relatively can be very conveniently carried out by introducing a relatively large quantity of cooled diluent gas, such as air, nitrogen, etc., at the same time (or shortly thereafter), as the ammonia and water vapor are introduced into the reactor. In this way cooling of the reaction products can be effected within a matter of four or five seconds or less after the formation of the $NH_3$—$H_2O$—$P_2O_5$ products.

The rate of introduction of ammonia and water vapor into the reactor will depend primarily upon the rate at which phosphorus is burned to produce phosphorus pentoxide. The introduction of ammonia should be in excess of two moles of ammonia per mole of phosphorus pentoxide, and will generally fall between about 2.2 and about 2.7 moles of ammonia per mole of phosphorus pentoxide. The amount of water introduced will be less than one mole of water per mole of phosphorus pentoxide and will generally fall between about 0.2 and about 0.8 mole of water per mole of phosphorus pentoxide. Particularly preferred compositions are prepared by introducing between about 2.4 and about 2.6 moles of ammonia and between about 0.3 and about 0.5 mole of water vapor per mole of phosphorus pentoxide.

The $NH_3$—$H_2O$—$P_2O_5$ products prepared as described immediately above will generally tend to fall within the area KLQP of Figure 2, although higher ratios of total ammonia to water can be obtained by an appropriate increase in the ratio of ammonia and water vapor fed to the reactor.

The following examples will serve as further illustration of the preparation and properties of the products of the present invention:

*Example 1*

An ammonia-water-phosphorus pentoxide product of the present invention was prepared in an apparatus of the type illustrated in Figure 3 by burning 1.9 pounds per hour of phosphorus vapor with 8 standard cubic feet per minute of air. The gaseous ammonia and steam were introduced at the rates of 1.7 and 0.18 pounds per hour, respectively. The reaction temperature (at the point of introduction of ammonia and steam) was maintained at between 240 and 250° C. by introducing 6 standard cubic feet per minute of cooling air along with the ammonia and steam. The resulting product was collected in a bag filter. The product analyzed 64.4 mole percent $NH_3$, 26.9 mole percent $P_2O_5$, and 8.7 mole percent $H_2O$. Of the nitrogen and the ammonia, 29 percent was present as nuclear nitrogen and about 71 percent was present as ammonium nitrogen.

The product had a water solubility in excess of 40 percent by weight. The pH of a 1 weight percent aqueous solution was 6.5; the pH of a 40 weight percent solution was 5.2. The viscosity of a 1 weight percent aqueous solution was 1.33 (specific viscosity with respect to water); the viscosity of a 40 weight percent solution was 52.0. The CRT (calcium repression test) value was 7.0.

The compositions produced as above-described can be treated to give products having particularly improved water-solubility characteristics. Such treatment consists generally in heating the compositions at a temperature between about 50° C. and about 125° C., and preferably between about 75° C. and about 100° C., for at least about one-half hour, and preferably from one to three hours, in an atmosphere of ammonia. In general, between about 0.5 and about 10 pounds per square inch (partial pressure), and preferably between about one and about three pounds per square inch of ammonia will be satisfactory, but higher or lower concentrations can also be used. An example of a particular effective atmosphere is one containing about 10 percent by volume of ammonia and 90 percent by volume of nitrogen at a total gas pressure of about one atmosphere.

The general result of treating the products in an ammonia-containing atmosphere as described immediately above, is to replace oxygen atoms with —$NH_2$— groups without effecting any appreciable change in the chain length of the polyphosphate products.

The following example illustrates the conversion of a product prepared as described in Example 1 above, by treatment in an ammonia-containing atmosphere:

*Example 2*

The product produced as described in Example 1 was placed in a rotary calciner held at 100° C. and maintained there for 1 hour while passing an equimolar mixture of gaseous ammonia and nitrogen through the calciner. The solubility of the resulting product was greater than 50 percent by weight. The pH of a 1 weight percent aqueous solution was 7.3; the pH of a 40 weight percent solution was 6.4. The viscosity of a 1 weight percent solution was 1.08, the viscosity of a 40 weight percent solution was 5.12. The CRT value was 7.5.

As pointed out in the foregoing specification, the limitations with respect to $P_2O_5$, $H_2O$, and nuclear $NH_3$ are descriptive only of polyamido (imido) phosphoric acids, whereas the compositions of this invention are the ammonium salts of such acids. In general, these salts will approach the normal salts (i.e., substantially all of the acidic hydrogens will be replaced by ammonium groups), but partially neutralized salts are also included—provided the molar ratio of total $NH_3$ (ammonium $NH_3$ and nuclear $NH_3$) to $H_2O$ is between about 1:4 and about 19:1, and preferably between about 3:1 and about 9:1.

The various salt products covered by the present invention are useful for a number of different applications. For example, the products are excellent sequestering agents for alkaline earth and heavy metal ions, and have the particularly desirable property of forming substantially neutral aqueous solutions (in contrast to the relatively highly alkaline solutions formed by the presently widely used sodium polyphosphates). The present products are useful as builders in synthetic detergent compositions, especially such compositions containing anionic surface-active agents. The present products are useful as conditioning and anti-caking agents for dry, powdered or granular materials, such as ammonium nitrate. They are also useful as non-permanent intumescent flame-proofing agents for inflammable materials such as cotton, wool, silk and other fabrics, and cellulosic materials such as paper and wood.

A particularly important utility of the present products involves their use as fertilizer materials. The high water solubility of the products (especially after treatment in an ammonia-containing atmosphere as described earlier) makes the materials outstandingly attractive for preparation of concentrated aqueous solutions having N—$P_2O_5$—$K_2O$ analyses approaching 10-35-0. The products can be utilized in combination with urea to prepare concentrated aqueous solutions with N—$P_2O_5$—$K_2O$ nutrient analyses approaching 25-25-0. The fact that the materials have an appreciable proportion of nitrogen in the form of nuclear nitrogen (as distinguished from ammonium nitrogen) allows the products to be used as a source of slowly available nitrogen, which can be applied to vegetation in larger than usual amounts in a single application without burning the vegetation. The nitrogen present as nuclear nitrogen then becomes available upon relatively slow hydrolysis of the polyphosphate, and is released over an extended period of time, as distinguished from ammonium nitrogen (which is released immediately upon dissolution in water).

I claim:

1. An ammonium polyphosphate composition comprising a mixture of linearly polymeric ammonium phosphate compounds containing at least 3 phosphorus atoms per molecule and having a sufficient number of oxygen atoms replaced by —NH— groups directly attached to phosphorus atoms to give the following analysis in terms of $P_2O_5$, $H_2O$, total $NH_3$ and nuclear $NH_3$: (a) the mole ratio of total $NH_3$ to $H_2O$ between about 7:3 and about 19:1, (b) the mole ratio of $H_2O$ to nuclear $NH_3$ between about 1:4 and about 4:1, and (c) the sum of $H_2O$ and nuclear $NH_3$ between about 50 mole percent and about 62.5 mole percent based upon the sum of $P_2O_5$, $H_2O$ and nuclear $NH_3$.

2. An ammonium polyphosphate composition comprising a mixture of linearly polymeric ammonium phosphate compounds containing at least 3 phosphorus atoms per molecule and a sufficient number of oxygen atoms replaced by —NH— groups directly attached to phosphorus atoms to give the following analysis in terms of $P_2O_5$, $H_2O$, total $NH_3$ and nuclear $NH_3$; (a) the mole ratio of total $NH_3$ to $H_2O$ between about 3:1 and about 9:1, (b) the mole ratio of nuclear $NH_3$ to $H_2O$ between about 3:1 and about 11:9, and (c) the sum of $H_2O$ and nuclear $NH_3$ between about 55 mole percent and about 60 mole percent based upon the sum of $P_2O_5$, $H_2O$ and nuclear $NH_3$.

3. The method of producing a reaction product of $NH_3$, $H_2O$ and $P_2O_5$, which method comprises introducing into a reaction zone maintained at a temperature between about 200° C. and about 600° C., (1) a dispersion of $P_2O_5$ in a dry, gaseous carrier, and (2) a gaseous mixture of ammonia and water vapor, said ammonia being introduced at a rate in excess of two moles per mole of $P_2O_5$, said water vapor being introduced simultaneously with said ammonia and at a rate between about 0.3 and about 0.8 mole per mole of $P_2O_5$, to produce a product having (a) the mole ratio of total $NH_3$ to $H_2O$ between about 7:3 and about 19:1, (b) the mole ratio of $H_2O$ to nuclear $NH_3$ between about 1:4 and about 4:1, and (3) the sum of $H_2O$ and nuclear $NH_3$ between about 50 mole percent and about 62.5 mole percent based upon the sum of $P_2O_5$, $H_2O$ and nuclear $NH_3$, and thereafter removing the reaction product from the aforesaid reaction zone and immediately cooling said reaction product.

4. The method of producing a reaction product of $NH_3$, $H_2O$ and $P_2O_5$, which method comprises introducing into a reaction zone maintained at a temperature between about 200° C. and about 600° C., (1) a dispersion of $P_2O_5$ in a dry, gaseous carrier, (2) gaseous ammonia, and (3) water vapor, said ammonia being introduced at a rate in excess of two moles per mole of $P_2O_5$, said water vapor being introduced subsequent to the introduction of said ammonia and at a rate between about 0.3 and about 0.8 mole per mole of $P_2O_5$, to produce a product having (a) the mole ratio of total $NH_3$ to $H_2O$ between about 7:3 and about 19:1, (b) the mole ratio of $H_2O$ to nuclear $NH_3$ between about 1:4 and about 4:1, and (3) the sum of $H_2O$ and nuclear $NH_3$ between about 50 mole percent and about 62.5 mole percent based upon the sum of $P_2O_5$, $H_2O$ and nuclear $NH_3$, and thereafter removing the reaction product from the aforesaid reaction zone and immediately cooling said reaction product.

References Cited in the file of this patent

UNITED STATES PATENTS

| | | |
|---|---|---|
| 1,194,077 | Ross et al. | Aug. 8, 1916 |
| 2,561,415 | Rice | July 24, 1951 |
| 2,713,536 | Driskell | July 19, 1955 |
| 2,717,198 | Jones et al. | Sept. 6, 1955 |

UNITED STATES PATENT OFFICE
CERTIFICATION OF CORRECTION

Patent No. 2,958,577                                 November 1, 1960

Peter G. Arvan

It is hereby certified that error appears in the above numbered patent requiring correction and that the said Letters Patent should read as corrected below.

Column 3, lines 68, 69 and 70, strike out "can be very conveniently carried out by introducing a relatively"; column 6, line 26, for "itnroduced" read -- introduced --.

Signed and sealed this 25th day of April 1961.

(SEAL)
Attest:

ERNEST W. SWIDER
Attesting Officer

DAVID L. LADD
Commissioner of Patents